Jan. 19, 1926.  1,570,023
M. M. WILCOX
CAM FOLLOWER AND METHOD OF MAKING SAME
Filed July 24, 1922
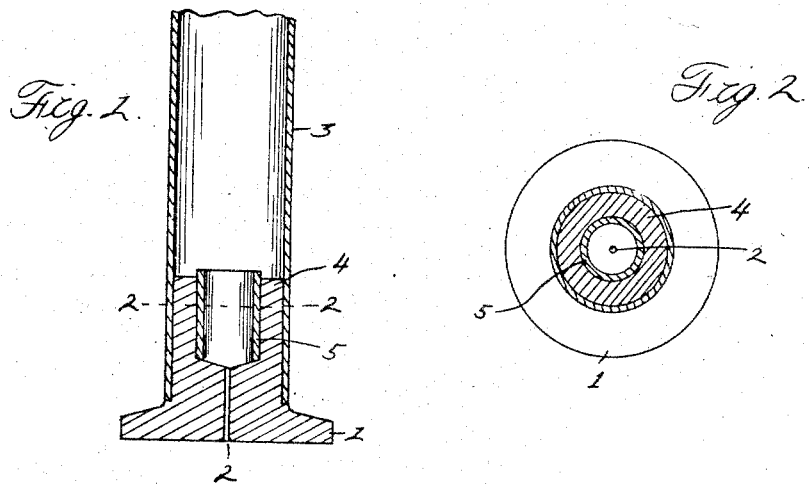
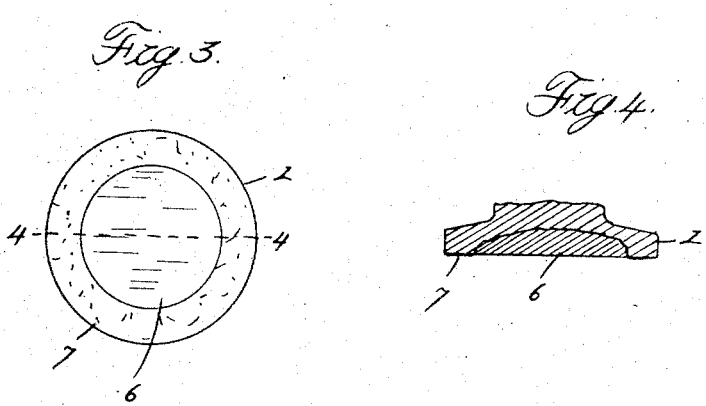
Inventor
Merrill M. Wilcox
Attorneys Patented Jan. 19, 1926.

1,570,023

UNITED STATES PATENT OFFICE.

MERRILL M. WILCOX, OF SAGINAW, MICHIGAN.

CAM FOLLOWER AND METHOD OF MAKING SAME.

Application filed July 24, 1922. Serial No. 577,264.

*To all whom it may concern:*

Be it known that I, MERRILL M. WILCOX, a citizen of the United States of America, residing at Saginaw, in the county of Saginaw and State of Michigan, have invented certain new and useful Improvements in Cam Followers and Methods of Making Same, of which the following is a specification, reference being had therein to the accompanying drawings.

This invention relates to valve actuating mechanisms and particularly to a cam follower having a base and a stem which are spot welded together.

An object of the invention is to provide strong and durable means for preventing the distortion of the stem and the extension of the base during the spot welding operation.

Another object is to provide simple and effective means for protecting the drain opening in the base by preventing the flow of metal during the spot welding operation.

Another object is to provide a base having a chilled face which will prevent wear and prolong the life of the cam follower.

Another object is to provide an unhardened peripheral portion upon the lower surface of the base as a precaution against chipping thereof at any time.

Another object is to provide a construction which can be manufactured at a very low cost.

With the above and other objects in view the invention consists of certain novel features of construction, combination and arrangement of parts as will be more fully described and particularly pointed out in the appended claims.

In the accompanying drawing:

Figure 1 is a vertical sectional view of a cam follower embodying my invention;

Figure 2 is a sectional view taken on the line 2—2 of Figure 1;

Figure 3 is a plan view showing a base having a hardened lower face and provided with an unfinished peripheral portion;

Figure 4 is a detail sectional view taken on line 4—4 of Figure 3.

Referring now to the drawing in which like characters of reference designate corresponding parts throughout the several views, the numeral 1 designates a base or head having a centrally disposed drain opening 2 formed therein. A hollow stem 3 surrounds a tubular extension 4 on the base.

It is sometimes the practice to spot weld the base to the stem and when the parts are of cast metal, as frequently is the case, the spot welding produces a flow which causes distortion of the parts as well as many times restricts or clogs the usual drain opening in the base. In order that the spot welding operation will not have any injurious effect upon the parts, a tubular member or sleeve 5, of any suitable material, is inserted within the extension 4. The sleeve 5 reinforces the extension 4 and prevents the collapsing of the stem as well as prevents the flow of metal through the drain opening 2.

In order to prevent wear and prolong the life of the follower the central portion of the base, which is normally in engagement with the engine cam shaft (not shown) is hardened by chilling as shown at 6. As shown in Figure 4 the chilled portion 6 increases in depth toward the center providing a relatively thick hardened portion to engage the cam shaft (not shown). The entire lower surface of the base may be finished smooth if desired, but the peripheral portion thereof is preferably left unfinished as shown at 7 in Figure 3. The peripheral portion 7 is also preferably left unhardened as a precaution against chipping.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. A cam follower comprising a base having an extension formed with an axial recess and a stem telescopically engaging said extension, a tubular sleeve secured within the recess of said extension.

2. A cam follower comprising a base having an extension formed with a recess and a stem telescopically engaging said extension and spot welded thereto, a wall within said recess adapted to reinforce said telescoped members and preventing the flow of metal into said recess during the spot welding operation.

3. In combination, a cam follower of cast metal having a base provided with an integral extension and a tubular stem welded to said extension, and a wall received in said tubular stem for preventing the distortion of said extension and said stem during the welding operation.

4. In a cam follower having a base provided with a drain opening and a tubular stem welded to said base, a member inserted within said tubular stem adapted to prevent flow of metal through said drain opening during the welding operation.

5. In combination, a cam follower made of cast metal and having a base provided with a drain opening, a stem welded to said base, a tubular member in said base above said drain opening for preventing the flow of metal therethrough during the welding operation.

6. In combination, a cam follower having a base provided with a drain opening, an apertured extension integral with said base, a stem welded to said extension, a tubular member within said extension for preventing the flow of metal through said drain opening and for preventing distortion of said extension and said stem during the welding operation.

7. In combination, a cam follower having a base provided with a drain opening, an apertured extension integral with said base, a tubular stem welded to the exterior of said extension, a tubular member within the aperture of said extension and projecting above the upper end thereof for preventing the flow of metal into said aperture during the welding operation.

8. The method of making cam followers consisting of forming a base with an opening and an extension about said opening, forming a wall within said extension around the upper end of the opening to prevent flow of metal thereinto during the welding operation, and welding a stem to said extension around said wall.

In testimony whereof I affix my signature.

MERRILL M. WILCOX.